Nov. 22, 1938.  C. E. MILLER  2,137,850
SPINDLE FOR AUTOMATIC LATHES
Filed May 22, 1937
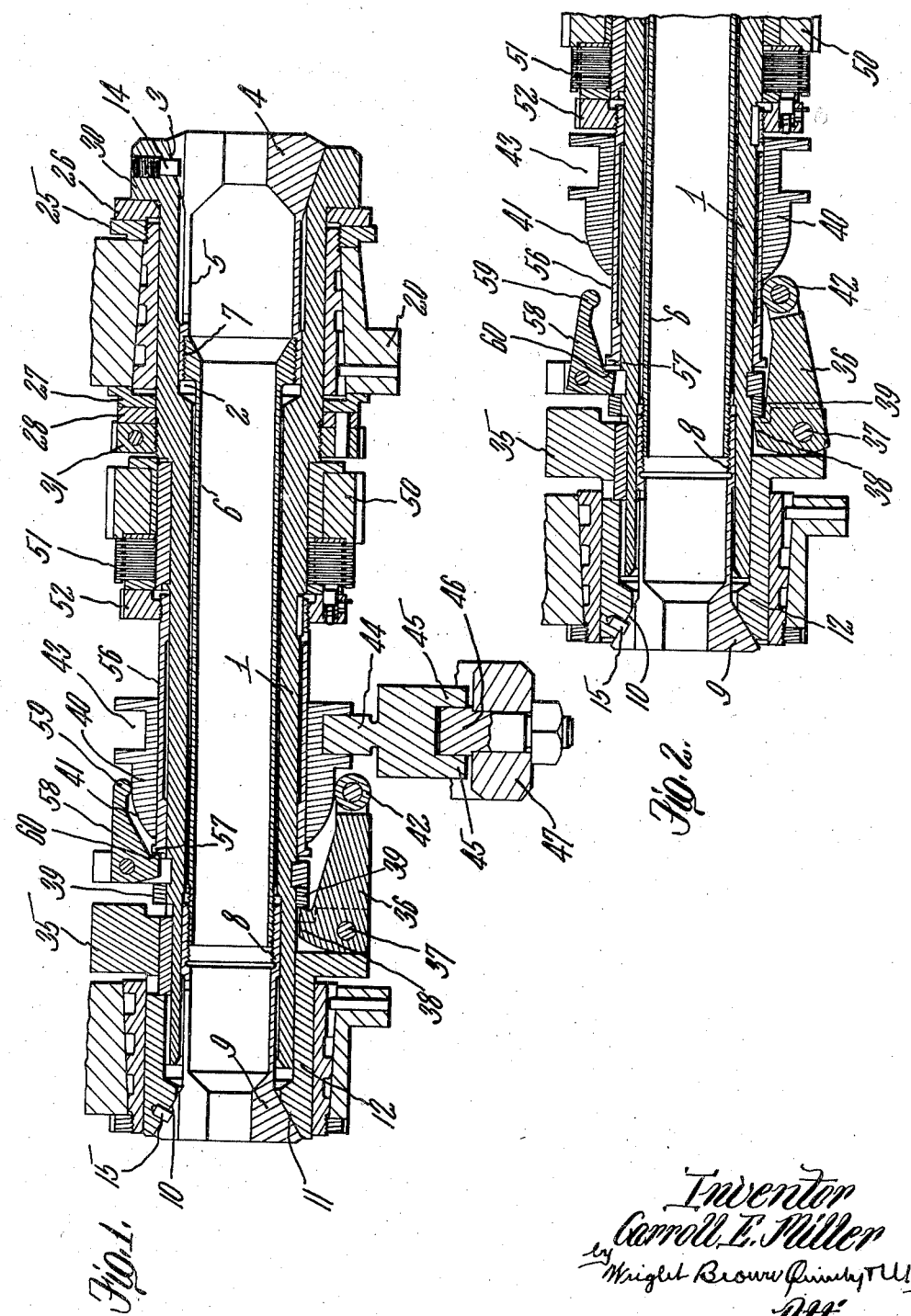

Patented Nov. 22, 1938

2,137,850

UNITED STATES PATENT OFFICE 2,137,850

SPINDLE FOR AUTOMATIC LATHES

Carroll E. Miller, Windsor, Vt., assignor to Cone Automatic Machine Company Inc., Windsor, Vt., a corporation of Vermont Application May 22, 1937, Serial No. 144,241

5 Claims. (Cl. 82—30)

This invention relates to spindles for automatic lathes and is more particularly concerned with lathes wherein it is desirable to stop the rotation of the spindle for removing completed work and the insertion of blanks.

An object of the present invention, therefore, is to simplify the control by causing the clamping and releasing of the work, and the starting and stopping of the spindle rotation to be effected in part by the same controlling mechanism.

This invention is shown in this application as embodied in a double end machine where the work is clamped for rotation with its opposite ends simultaneously exposed to machining operations, but it will be evident to those skilled in the art that this is only one of a considerable number of situations where such an inter-control between the gripping and work-rotating means is desirable. In its broadest aspects, this invention, therefore, is not limited to a double end machine, as the invention is applicable whenever it is desirable or necessary to stop the rotation of the work holder to remove the finished work and replace it with a blank.

For a more complete understanding of this invention, reference may be had to the accompanying drawing where Figure 1 is a longitudinal central section through a work spindle and related parts and embodying this invention, the work spindle shown being for a double end multiple spindle lathe of the double collet type, the collets and the spindle clutch being shown in closed position.

Figure 2 is a view similar to a portion of Figure 1, but showing one of the collets and the clutch open.

Referring to the drawing, at 1 is indicated a hollow rotary work spindle. At one end portion of this spindle it is shown as provided with an enlarged bore portion 2 terminating in a conical or wedge face 3. Cooperating with this face are the correspondingly tapered wedge faces of spring fingers 4 of a spring collet 5. This collet is shown as secured to a sleeve 6 as by a threaded connection at 7 and the opposite end of this sleeve is similarly connected to the inner end of a second spring collet 8 having the spring fingers 9. Cooperating with the tapered faces 10 of the spring fingers of the collet 8 is a conical or wedge face 11 of a sleeve 12 which is telescopically related to the spindle 1 so that as the sleeve 12 and the spindle 1 are moved apart, the tapered face 3 of the spindle and the tapered face 10 of the sleeve simultaneously engage and close together the spring fingers of the respective collets in order to clamp work (not shown), passing lengthwise through the spindle, in fixed position. The collets are prevented from rotating relative to the spindle and the sleeve 12, as by means of suitable key elements as 14 and 15 carried by the spindle and sleeve, respectively, and riding in spaces between certain of the spring fingers of the collets. The spindle 1 is journaled in a bearing 29 which may be a portion of an indexing drum for supporting a plurality of spindles as in a multi-spindle machine, and it is held against axial motion with reference to this bearing in any suitable manner as by the collar elements 25 and 26, 27 and 28 interposed between the sides of the bearing, and a shoulder 30 integral with the spindle on one side and an adjusting nut 31 on the opposite side.

The spindle and the sleeve 12 may be extended to force the spring collets into work-clamping condition and for this purpose the inner end of the sleeve 12 is shown as provided with an outwardly extending flange 35 which is slotted at intervals to receive within the slots a series of spreader fingers 36, one of which is shown in these figures, it being understood that they may be arranged as desired angularly spaced about the circumference of the flange 35. Each of these arms 36 extends generally lengthwise of the spindle and is pivoted as at 37 to the flange 35. It is provided with a short arm 38 which may be engaged with a collar 39 secured to the spindle 1 so that as the fingers 36 are rocked outwardly from the spindle, the arms 38 are forced against the collar 39 and the sleeve 12 is forced to the left, as viewed in Figure 1, thus to extend the sleeve from the spindle and force the collet fingers of both collets to work-gripping position. This action of the spring fingers 36 may be produced by moving a wedge collar 40 having a tapered periphery 41 to the left, as viewed in Figure 1, so that bearing rolls 42 journaled at the outer ends of the fingers 36 may ride thereon and the fingers be forced outwardly. This collar 40 is shown as provided with a peripheral groove 43, which, when the spindle is in the proper indexed position, may ride on each side of an actuating block 44. This block 44 in its turn is provided with spaced flanges 45 between which may ride a block 46 carried by an actuating arm 47. Motion of this arm 47 will cause a corresponding actuating motion of the sleeve 40 thus to close the collets against the work when the collar 40 passes inwardly of the fingers 36 and will allow the collets to spring open and release the work when the collar 40 is withdrawn.

The spindle is provided with means for rotating it, as shown such means comprising a gear 50 journaled thereon intermediate to its ends and between the work-gripping means, and driven by any suitable means (not shown) and has interposed between the gear 50 and the spindle a clutch 51. As shown this clutch is of the multiple ring type and is closed by forcing the rings together as by producing axial motion of a ring 52 to the right as shown in these figures. By moving the ring 52 to the left, the clutch rings are released so that the gear 50 is no longer able to rotate the spindle. This motion of the ring 52 is produced by the motion of the collar 40 which controls the opening and closing of the work-gripping means. As shown the collar 40 rides on the outer face of a sleeve 56, the right hand end of which, as shown, is secured as by a threaded connection to the ring 52. The left hand end of the sleeve 56 is shown as turned outwardly to form a flange 57, and this flange may be contacted and pressed to the right to close the clutch 51 by the rocking of fingers 58 arranged in a second set and interposed between the fingers 36 which actuate the collet mechanism. These fingers 58 also extend substantially lengthwise of the spindle and have follower end portions 59 which may ride on the wedge face of the sleeve 40. Each of these fingers 58 has a short extension 60 which engages the outer face of the flange 57, so that when the sleeve 40 is moved to the left, as shown in Figure 1, the fingers 58 are rocked outwardly and the clutch is closed, while when the sleeve 40 is moved to the right into the position shown in Figure 2, both the fingers 58 and the fingers 36 are released and allowed to swing inwardly, opening the clutch and releasing the spring collets from the work.

From the foregoing description of an embodiment of this invention, it should be evident to those skilled in the art that various changes and modifications may be made without departing from the spirit or scope of the invention as defined by the appended claims.

I claim:

1. In combination, a rotary spindle, a pair of spaced work-gripping means carried by said spindle, spindle-rotating means located between said work-gripping means, a clutch interposed between said spindle and said rotating means, mechanism for actuating said gripping means to grip or release the work, and connections from said mechanism for controlling said clutch to hold said clutch closed when work is gripped and to hold said clutch released when said gripping means are open.

2. In combination, a rotary spindle, work-gripping means carried by said spindle adjacent to each end, spindle-rotating means intermediate to said ends, a clutch interposed between said rotating means and spindle, means including a member movable axially of said spindle for closing and releasing said gripping means, and connections actuated by the motion of said member for closing and opening said clutch.

3. In combination, a rotary spindle, work-gripping means carried by said spindle, spindle-rotating means, a clutch interposed between said rotating means and spindle, means including a series of rockable fingers extending generally lengthwise of said spindle and arranged about the axis of said spindle and rockable outwardly for closing said gripping means and inwardly for releasing said gripping means, a wedge sleeve movable longitudinally on said spindle for forcing said fingers outwardly or releasing said fingers depending on the direction of motion of said sleeve, a series of fingers pivotally mounted and interposed between said gripping-means-controlling-fingers and controlled by motion of said sleeve, and connections between said second-mentioned fingers and said clutch timed to cause said clutch to be closed when said gripping means is closed and to be open when said gripping means is open.

4. In combination, a rotary spindle, a pair of means spaced lengthwise of said spindle for gripping and releasing work, means including a member movable on said spindle between said gripping means for simultaneously actuating said gripping means to grip or release work, means for rotating said spindle, a clutch interposed between said rotating means and said spindle, and means actuated by movement of said member to close and open said clutch timed to hold said clutch closed when said gripping means are in gripping position and to cause said clutch to be open when said gripping means are released.

5. In combination, a rotary hollow spindle, a pair of oppositely facing spring collets within said spindle, a sleeve telescopically related to said spindle, said spindle and sleeve having wedge faces coacting with said collets to close said collets when said sleeve is projected and to release said collets when said sleeve is retracted, a plurality of pivoted collet-closing fingers arranged about the axis of said spindle and extending generally lengthwise of said spindle, and when moved outwardly extending said sleeve to contract said collets, a wedge sleeve movable axially of said spindle beneath said fingers, spindle-rotating means, a clutch interposed between said rotating means and spindle, and a plurality of clutch-actuating fingers interposed between said collet-closing fingers and in operative relation to said wedge sleeve for closing and opening said clutch.

CARROLL E. MILLER.